United States Patent Office 3,525,859
Patented Aug. 25, 1970

3,525,859
AUTOMATIC OPERATE-RESET CONTROL FOR ANALOG COMPUTER ELEMENTS
James R. Patmore, Neptune, N.J., assignor to Electronic Associates Inc., Long Branch, N.J., a corporation of New Jersey
Filed Mar. 20, 1968, Ser. No. 721,130
Int. Cl. G06g 7/12
U.S. Cl. 235—183      2 Claims

ABSTRACT OF THE DISCLOSURE

The specification discloses a method and apparatus for providing readout of the output of an analog computer element which enables the use of unstabilized amplifiers as the computing element including the sampling and storage of the output of a particular computer element, and the continual switching of that computer element between its operate and reset modes; the sample being taken just prior to switching from operate to reset.

---

This invention relates to a method and apparatus for controlling readout of the various computing elements which constitute an analog computer.

It has been a long standing goal of the computer industry to produce very low cost analog computers. A major barrier in realizing this goal has been the need to use stabilized operational amplifiers in the various computing elements. This need provides the cost limiting factor below which very little has been accomplished. The stabilized amplifiers are required because of the drift problem present in the unstabilized amplifier. For example, a general procedure in problem solving on an analog computer involves the mathematical integration of a variable and holding the result of the integration for readout by the operator. If an unstabilized amplifier were used, the drift of the amplifier would destroy the accuracy needed by the operator.

The present invention provides a control circuit for analog computing elements which enables the use of unstabilized amplifiers as the computing elements in place of the expensive stabilized amplifiers heretofore considered requisite.

The circuit controls the computing element by switching it between operate and reset conditions at a rate so rapid that any amplifier drift which occurs during either condition is unable to degrade the information needed by the operator. Of course, operating and resetting at such a rapid rate would normally deprive the operator of any capability of reading out the values developed by the computing elements during the operate condition since the operator cannot respond with such rapidity. The present invention eliminates this problem by providing storage capacitor means to preserve operator readout capability. The circuit functions by providing means for the operator to set the desired operate time interval into the circuit. In the exemplary embodiments, the circuit then controls the computing elements at a rate proportional to this set time interval by the firing times of a blocking oscillator. The oscillator output accomplishes two control functions: first, a pulse of predetermined duration turns on a switching arrangement for a fixed duration dependent upon the pulse width, thereby allowing the value of the parameter the computing element developed during the operate condition to store on a capacitor; the second sets the computer elements to either reset or operate. The storage capacitor may be connected to either an appropriate meter, an oscilloscope, or other display device thereby providing operator readout capability of the signal stored thereon.

The computing elements are thus switched from reset to operate for the interval of operation (for example, integration) set by the operator and the value developed by the element during that interval is stored for readout.

The operator, or automatic means, may reset the timing means for different intervals of operation as desired, and the above procedure repeats.

A principal object of the invention is the provision of means permitting the use of unstabilized amplifiers as computing elements in an analog computer, thereby reducing computer cost.

A further object is the provision of a control circuit which provides rapid switching of computer elements from operate to reset while also providing a storage circuit for operator readout capability.

These as well as other objects of the invention will become apparent from the following description and claims when read with reference to the drawings in which:

In brief, the circuit includes variable timing means, means responsive to said timing means for controlling electronic switch means which permits electrical storage on a storage element and for initiating cyclical control of computing elements at a predetermined constant rate.

Figure 1:
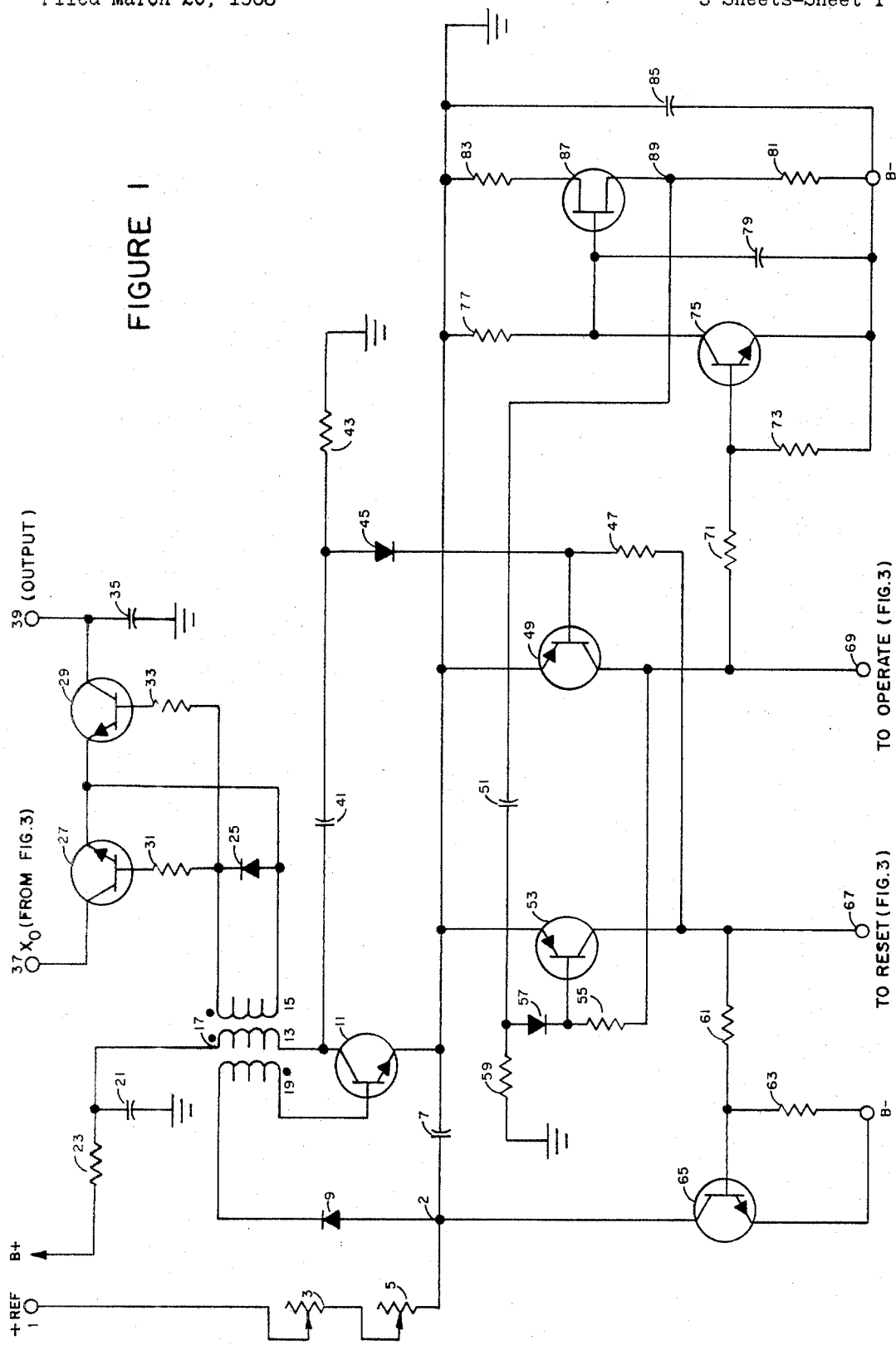
FIG. 1 is a schematic diagram of one circuit embodying the invention.

In FIG. 1, reference numeral 1 denotes a source of positive voltage which, in practice, may be 10 volts, connected to a series arrangement of resistive stepping switches 3 and 5. Switch 3, in practice, may be a 10KΩ 10 step component while switch 5 is a 100KΩ 10 step device. This series connection thus provides 100 different settings. These switches are connected to point 2 which constitutes the junction of the high side of capacitor 7, the anode of diode 9, and the collector of switching transistor 65. In operation, capacitor 7 is charged to a voltage determined by the break-down voltage of diode 9. The discharge rate of this capacitor is controlled by the resistance set on switches 3 and 5.

Transformer 13 has a primary winding 19 and two secondary windings 15 and 17. The primary winding 19 is connected in series between the cathode of diode 9 and the base of transistor 11 operating in the grounded emitter configuration.

The secondary winding 17 of transformer 13 is connected between the collector of transistor 11 and the juncture of resistor 23 and capacitor 21. Resistor 23 is connected to a source of positive voltage which, in practice, may be 15 volts. The entire combination of transistor 11, windings 17 and 19 of transformer 13, capacitors 7 and 21, resistor 23, and diode 9 constitutes a blocking oscillator circuit which triggers on receipt of a signal through diode 9.

Secondary winding 15 of transformer 13 has diode 25, poled as shown, connected thereacross. This diode serves to clamp the reverse transient generated by the collapse of the field in transformer 13. Resistors 31 and 33 are connected in parallel between one side of transformer winding 15, and the bases of transistors 27 and 29, respectively. The other side of the winding is connected to the common emitter connection of transistors 27 and 29. The collector of transistor 29 is connected to the high side of grounded capacitor 35, both of which are connected to an output terminal 39. An input terminal 37 is connected to the collector of transistor 27. When the blocking oscillator triggers, a pulse of predetermined width is developed across winding 15 and diode 25 which pulse causes transistors 27, 29 to turn ON for the duration of the pulse.

The output from the blocking oscillator at the collector of transistor 11 is differentiated by a circuit consisting of capacitor 41 and resistor 43. Diode 45 serves to couple only the positive pulse of the differentiated signal as an input to the base of transistor 49. Transistors 49 and 53 and resistors 47 and 55 constitute a multi-vibrator circuit which feeds output terminals 67 and 69. Terminal 69 is the operate output while terminal 67 is the reset terminal. Resistors 61 and 63 and transistor 65 constitute a switching circuit which is controlled by the signal fed to output terminal 67.

The reset time is controlled by a timing circuit consisting of unijunction transistor 87, resistors 81 and 83, transistor 75 and resistors 71, 73 and 77. Resistor 77 and capacitor 79 provide a timing circuit for the unijunction transistor 87. Resistor 73 is the bias resistor for transistor 75. Capacitor 85 serves to suppress transient signals.

The circuit operates as follows: when a signal appears at the base of transistor 49 from the blocking oscillator that transistor turns OFF, turning ON transistor 53 through the connection between the collector of transistor 49, resistor 55 and the base of transistor 53; thereby putting he computer element in its reset mode.

When transistor 53 is ON, terminal 67 is at ground potential turning transistor 65 ON. With transistor 65 ON, point 2 is thus at B— and capacitor 7 charges in a negative direction towards B—. With transistor 49 OFF, the output at the collector of transistor 49 is connected through resistor 71 to the base of transistor 75. After amplification by transistor 75, the output at the collector of transistor 75 is connected to the base of unijunction transistor 87 causing that transistor to produce a pulse output at point 89. That output pulse is coupled through a differentiator circuit consisting of capacitor 51 and resistor 59 to the anode of coupling diode 57 thence to the base of transistor 53 turning this transistor OFF. Finally, when transistor 53 is OFF, the output at its collector is fed to both the base of transistor 49 turning this transistor ON, and to the reset output terminal 67 switching the computing element to the operate condition. With transisor 53 OFF, transistor 65 is OFF and capacitor 7 discharges in a positive direction toward +Ref.

Returning to the discussion of switching transistors 27 and 29, and storage capacitor 35, it will now be apparent that the signal at input terminal 37 is stored on capacitor 35 during the time interval transistors 27 and 29 are turned ON. The time of firing for the blocking oscillator is controlled by the capacitor 7, the resistance inserted by resistive switches 3 and 5, and by the appearance of a signal at the collector of transistor 65. When the computing element goes to reset, the blocking oscillator again fires, and the above described procedure repeats.

Figure 2:
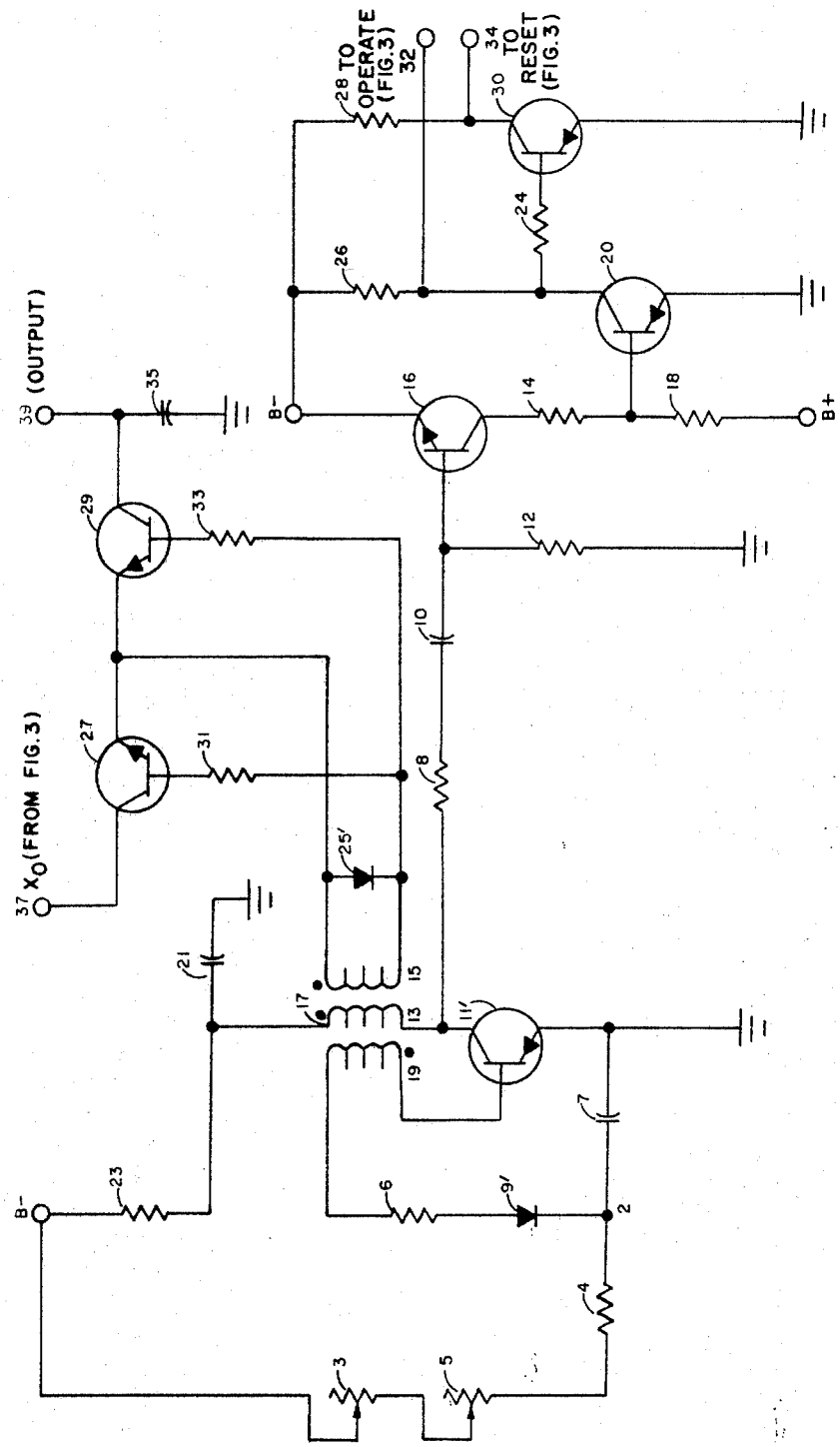
FIG. 2 is a schematic diagram of a simplified circuit embodying the invention.

FIG. 2 shows a simplified circuit embodying the concepts of the invention. Like numerals have been used to designate like components in both FIGS. 1 and 2. In FIG. 2, the primed numerals indicate components of a polarity reversed from that shown in FIG. 1.

In FIG. 2, capacitor 7 charges positively to a value determined by base current flow during the blocking oscillator action. This current flow is limited by resistor 6. Resistor 4 and variable resistors 3 and 5 control the discharge rate of capacitor 7. When capacitor 7 discharges towards B— to a point governed by diode 9', the blocking oscillator again fires.

A pulse output is taken from the collector of transistor 11' to charge capacitor 10 through resistor 8 and the base to emitter junction of transistor 16 to a predetermined value. The discharge rate of this capacitor is controlled by resistor 12. When the signal at the base of transistor 16 goes negative, this transistor is turned OFF. Resistors 14 and 18 constitute a voltage divider bias circuit for transistor 20. With transistor 16 in an OFF condition, transistor 20 is also turned OFF and transistor 30 is turned ON producing output pulse signals coincident in time but 180° out of phase at terminals 32 and 34. These signals are connected to the mode control switches of an analog computing element and, as will be described later in more detail, serve to place the computing element in the operate mode. Phase reversal of the signals appearing at terminals 32 and 34 place the computing element in the reset mode. Resistors 26 and 28 are the collector load resistors for transistors 20 and 30 respectively. Resistor 24 is the base resistor for transistor 30.

Figure 3:
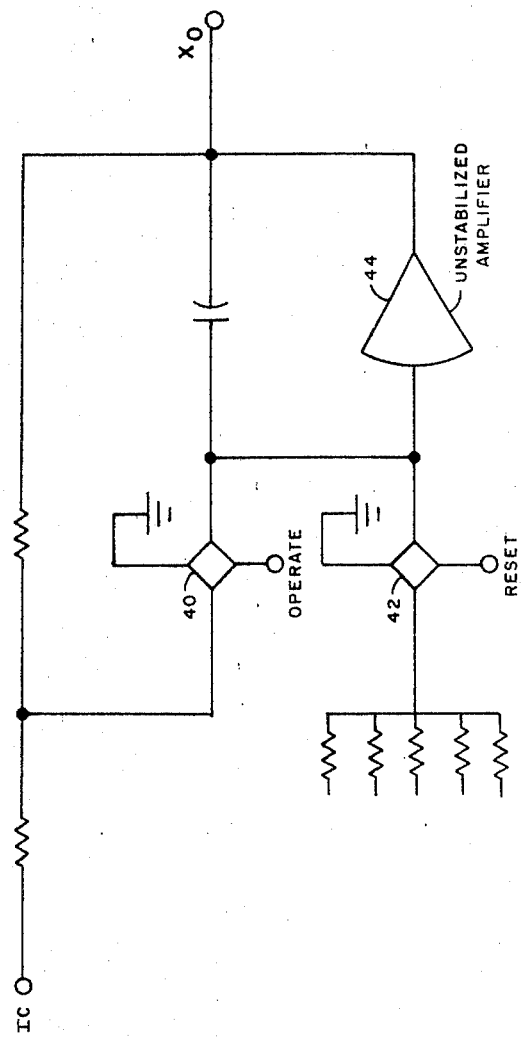
FIG. 3 is a schematic diagram of a mode control circuit useable with the invention.

In practice, one circuit of the type shown in FIGS. 1 or 2 may be used for each computing circuit such as that shown in FIG. 3. However, if several computing circuits are to have the same operate time, then the blocking oscillator timing circuit of FIGS. 1 or 2 may be used to control all of these computing circuits. Such a modification requires the addition of a capacitor such as 35 and switching transistors such as 27 and 29 for each computing circuit output. The several switching circuits would be controlled by the oscillator output.

A suitable mode control cirucit for an analog computing element such as an integrator, is shown at page 374, Figure 10–1(a), of Electronic Analog and Hybrid Computers, by Korn and Korn, published in 1964 by McGraw-Hill. This circuit uses a stabilized operational amplifier while such a stabilized amplifier is not needed with applicant's circuit. The input terminal 37 in applicant's FIGS. 1–2 may be connected to the $X_0$ output of the Korn and Korn circuit while operate-reset terminals 67, 69, FIG. 1 and 32, 34, FIG. 2, are connected to the busses for relays $K_R$ and $K_H$ respectively. In operation, relays $K_R$ and $K_H$ would either be both energized or both deenergized creating the conditions shown in Figure 10–1 (b), of Korn and Korn.

For faster operation, electronic switches may be substituted for relays $K_R$ and $K_H$ in the porn and Korn as shown in applicant's FIG. 3. In FIG. 3, electronic switches 40 and 42 are shown in place of $K_R$ and $K_H$ and amplifier 44 is unstabilized. The remainder of the circuit is as shown in Korn and Korn.

Now that the principal embodiments of the invention have ben described, it will be apparent that further modifications may be made without departing from the spirit and scope of the invention. For example, NPN and PNP transistors may be used in the circuits as desired. Thus, the foregoing description is intended as illustrative of the invention and not as limitive thereof. The scope of the invention is defined by the appended claims.

I claim:

1. A storage and control circuit for an analog computing element comprising:
    an analog computing element for producing an output signal including mode control means for placing said element in an operate or a reset mode;
    a terminal connected to said computing element for receiving said output signal,
    electrical storage means for storing said output signal;
    a source of control pulses;
    first switch means connected to said terminal, said storage means, and responsive to said pulse source for applying said output signal to said storage means under control of said pulses,
    second switch means connected to said mode control means for switching said element between said modes in response to said pulses, and
    delay means interposed between said pulse source and said second switch means to switch said second switch means just after the switching of said first switch means.

2. A storage and mode control system for an analog computing element whereby the element utilizes an unstabilized operational amplifier, said system comprising:
an analog computing element for producing an output signal and having operate an dreset mode control terminals,
electrical storage means for storing said output signal,
pulse source means including a blocking oscillator for generating pulses of predetermined time duration,
first switching means connected to said electrical storage means, and to said analog computing element for controlling the application of said output signal to said storage means in response to said pulses,
second switch means connected to said operate and reset mode control terminals for switching the modes between said terminals in response to said pulses; and
delay means connected between said pulse source and said second switch means for delaying the switching of said modes with respect to the actuation of said first switch means.

References Cited

UNITED STATES PATENTS

| | | | |
|---|---|---|---|
| 3,098,214 | 7/1963 | Windes et al. | 307—257 X |
| 3,253,161 | 5/1966 | Owen | 307—246 |
| 3,263,177 | 7/1966 | Durrett | 328—151 X |
| 3,286,101 | 11/1966 | Simon | 307—229 |
| 3,371,223 | 2/1968 | Gilbert | 328—127 X |
| 3,374,362 | 3/1968 | Miller | 235—183 X |
| 3,381,231 | 4/1968 | Gilbert | 235—183 X |
| 3,394,272 | 7/1968 | Fischman | 307—295 X |

EUGENE G. BOTZ, Primary Examiner

F. D. GRUBER, Assistant Examiner

U.S. Cl. X.R.

235—184; 328—127, 151; 307—238 240, 247, 275; 330—9